(12) United States Patent
Youchison et al.

(10) Patent No.: US 12,176,114 B2
(45) Date of Patent: Dec. 24, 2024

(54) HIGH EFFICIENCY FOAM COMPACTS FOR TRISO FUELS

(71) Applicant: UT-Battelle, LLC, Oak Ridge, TN (US)

(72) Inventors: Dennis L. Youchison, Oak Ridge, TN (US); Brian Williams, Camarillo, CA (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 18/118,390

(22) Filed: Mar. 7, 2023

(65) Prior Publication Data

US 2023/0207142 A1    Jun. 29, 2023

Related U.S. Application Data

(62) Division of application No. 17/060,199, filed on Oct. 1, 2020, now abandoned.

(Continued)

(51) Int. Cl.
*G21C 3/04* (2006.01)
*G21C 3/60* (2006.01)

(52) U.S. Cl.
CPC .............. *G21C 3/044* (2013.01); *G21C 3/60* (2013.01)

(58) Field of Classification Search
CPC .................................................... G21C 3/044
See application file for complete search history.

(56) References Cited

U.S. PATENT DOCUMENTS 3,028,330 A * 4/1962 Huntington .............. G21C 3/64
                                                        376/427
4,092,384 A * 5/1978 Hrovat ..................... G21C 3/28
                                                        264/0.5

(Continued)

OTHER PUBLICATIONS

Williams, Brian E., and Youchison, Dennis L . . . Integration of TRISO Fuel with Open-Cell Foam for Increased Performance and Manufacturability. United States: N. p., Mar. 26, 2018. Web. (Year: 2018).*

(Continued)

*Primary Examiner* — Lily C Garner
(74) *Attorney, Agent, or Firm* — WARNER NORCROSS + JUDD LLP (57) ABSTRACT

A nuclear fuel element is provided. The nuclear fuel element includes a porous support. The porous support includes a ligament and defines a pore adjacent to the ligament. The ligament has an interior surface spaced from the pore. The interior surface defines a void. The porous support includes silicon carbide. The nuclear fuel element includes a nuclear fuel material disposed in the pore. The nuclear fuel material includes a moderator and tri-structural isotropic (TRISO) particles. Another nuclear fuel element is provided. The nuclear fuel element includes a porous support. The porous support includes a ligament and defines a pore adjacent to the ligament. The ligament has an interior surface spaced from the pore. The interior surface defines a void. The ligament includes the nuclear fuel material. The nuclear fuel element includes a facesheet overlying the porous support and defines a hole. The hole is in fluid communication with the void. The nuclear fuel material includes a nuclear fuel.

5 Claims, 9 Drawing Sheets

Related U.S. Application Data (60) Provisional application No. 62/908,779, filed on Oct. 1, 2019.

(56) References Cited

U.S. PATENT DOCUMENTS

| | | | | |
|---|---|---|---|---|
| 4,681,732 | A | * | 7/1987 | Mallener ................. G21C 9/022 376/337 |
| 5,061,660 | A | | 10/1991 | Park et al. |
| 5,094,804 | A | * | 3/1992 | Schweitzer ............ G21C 3/044 376/414 |
| 6,033,506 | A | * | 3/2000 | Klett ..................... F28D 20/023 156/78 |
| 7,401,643 | B2 | | 7/2008 | Queheillalt et al. |
| 7,899,146 | B1 | * | 3/2011 | Youchison ............... G21C 3/58 376/222 |
| 8,774,344 | B1 | * | 7/2014 | Wells ........................ G21C 3/20 376/411 |
| 8,828,540 | B2 | * | 9/2014 | Schmidt ............ C04B 35/62873 428/367 |
| 8,920,871 | B1 | * | 12/2014 | Youchison ............. G21C 21/02 427/6 |
| 9,217,084 | B2 | | 12/2015 | Schaedler et al. |
| 9,620,248 | B2 | * | 4/2017 | Venneri ................... C23C 16/26 |
| 9,721,679 | B2 | * | 8/2017 | Ahlfeld ..................... G21C 3/42 |
| 9,881,699 | B2 | * | 1/2018 | Shaefer ................... C01B 33/32 |
| 2011/0091004 | A1 | * | 4/2011 | Farmer ..................... G21B 1/01 376/412 |

OTHER PUBLICATIONS

NRC "TRISO-Coated Fuel Particle Performance." Excerpted relevant pp. 2-1 and 2-2. Accession No. ML040650057. Published Mar. 11, 2004. Full text available at adams.nrc.gov/wba (Year: 2004).*

Williams et al., "Integration of TRISO Fuel with Open-Cell Foam for Increased Performance and Manufacturability", USDOE Office of Nuclear Energy, Fuel Cycle Technologies Technical Report, Mar. 26, 2018 (2018).

Youchison et al., "A Tricarbide Foam Fuel Matrix for Nuclear Thermal Propulsion", 42nd American Institute of Aeronautics and Astronautics Joint Propulsion Conference and Exhibit (2006).

* cited by examiner

HIGH EFFICIENCY FOAM COMPACTS FOR TRISO FUELS

CROSS-REFERENCE TO RELATED APPLICATIONS

This application is a divisional of U.S. patent application Ser. No. 17/060,199 filed Oct. 1, 2020, which claims the benefit of U.S. Provisional Application 62/908,779, filed Oct. 1, 2019, the disclosures of which are incorporated by reference in their entirety.

STATEMENT REGARDING FEDERALLY SPONSORED RESEARCH AND DEVELOPMENT

This invention was made with government support under Grant No. DE-SC0019974 and Contract No. DE-AC05-00OR22725 awarded by the U.S. Department of Energy. The government has certain rights in the invention.

FIELD OF THE DISCLOSURE

The present invention relates generally to porous nuclear fuel elements, in particular, for use in advanced high temperature gas-cooled nuclear reactors (HTGRs) and gas-cooled fast reactors (GFRs), and to methods for fabricating same.

BACKGROUND OF THE DISCLOSURE

High temperature gas-cooled nuclear reactors (HTGRs) have been operated using pebble-bed core designs with spherical fuel elements (60 mm diameter "pebbles") made of TRISO fuel particles embedded in a graphite matrix. Each TRISO fuel particle is a microsphere (0.9 mm diameter) comprising a kernel/core of fissile material ($UO_2$ or $UC_2$) coated by multiple layers of protective barrier materials (also commonly referred to as "cladding"), e.g., a porous carbon buffer layer, followed by pyrocarbon, followed by silicon carbide, followed by an external coating of pyrocarbon. A typical reactor core might contain 11,000 fuel pebbles each containing thousands of TRISO particles. TRISO fuel is a key component of advanced small modular nuclear reactors due to its inherent safety at high temperatures and irradiation levels and decreased proliferation risk relative to current reactors. For HTGRs, a more efficient cooling method for TRISO fuel elements may increase thermal control and allow for an increase in fuel density.

Gas-cooled fast reactors (GFRs) are high-temperature helium-cooled fast-spectrum reactors with a closed fuel cycle. These features provide for efficient conversion of fertile uranium and management of actinides. The core of GFRs has a high fissile fuel content as well as a non-fissile, fertile, breeding component. There is no neutron moderator in GFRs, as the chain reaction is sustained by fast neutrons. Active venting of fission product gases and the resultant decrease in cladding stress in TRISO fuel elements for GFRs would significantly increase fuel lifetime and enable operating with a deep burn fuel cycle.

Highly porous (e.g., 90% porous) metal carbide foam structures have been fabricated through chemical vapor deposition of one or more layers of a refractory metal carbide, for example, ZrC or NbC, on a porous foam skeleton made of, for example, reticulated vitreous carbon (RVC). These metal carbide foams have been used as thermal protection systems, actively cooled structures/heat exchangers, flash and blast suppressors, and lightweight mirror substrates. The interconnected open cell geometry and tortuous flow path provides excellent heat exchange properties, excellent particulate filtration, with a correspondingly low mass. However, conventional incorporation of nuclear fuel into these highly porous metal carbide foam structures has not resulted in the cooling necessary for HTGRs and the gas mobility for GFRs.

Accordingly, there remains a need for improved nuclear fuel elements exhibiting improved cooling and gas mobility.

SUMMARY OF THE DISCLOSURE

In one embodiment, a nuclear fuel element is provided. The nuclear fuel element includes a porous support. The porous support includes a ligament and defines a pore adjacent to the ligament. The ligament has an interior surface spaced from the pore. The interior surface defines a void. The porous support includes silicon carbide. The nuclear fuel element includes a nuclear fuel material disposed in the pore. The nuclear fuel material includes a moderator and tri-structural isotropic (TRISO) particles.

In another embodiment, a nuclear fuel element is provided. The nuclear fuel element includes a porous support. The porous support includes a ligament and defines a pore adjacent to the ligament. The ligament has an interior surface spaced from the pore. The interior surface defines a void. The ligament comprises, consists essentially of, consists of, or if formed from the nuclear fuel material. The nuclear fuel element includes a facesheet overlying the porous support and defines a hole. The hole is in fluid communication with the void. The nuclear fuel material includes a nuclear fuel. In various embodiments, the nuclear fuel is further defined as a fissile nuclear fuel.

For high temperature gas-cooled reactors (HTGR), the potential exists to cast and sinter a slurry of TRISO particles and graphite into the open cells of highly porous silicon carbide foam that has hollow ligaments. The foam provides structural reinforcement for the TRISO/graphite mixture and the hollow ligaments, which can be varied in size and spacing, serving as network cooling passages thereby allowing for coolant flow in much closer proximity to the fuel particles compared to current fuel elements. In addition, by using SiC foam, the thermal conductivity of the fuel element increases. To this end, the interconnected microchannels allow helium coolant to flow close to the fuel particles for efficient heat removal. The microchannel size and spacing can be varied substantially for the TRISO particles in foam structure to establish the optimal combination of pressure drop, cooling efficiency, and fuel density.

This design capitalizes on the established technology base regarding the robustness of TRISO fuel encapsulation, and drastically reduces the thermal gradients in large compacts, yet be easy to manufacture. It also permits a substantial increase in fuel density enabling lower enrichment scenarios for the fuel. The development focuses on a thermal reactor neutron spectrum, relying on the graphite in the matrix to provide the moderation. The design also provides the significant thermal mass required for loss of pressure excursions.

For gas-cooled fast reactors (GFR) using a deep-burn fuel cycle, the potential exists to make TRISO-like hollow ligament foam in which the ligaments are composed of UCO fuel as the inner layer deposited by CVD, followed by the same cladding layers currently deposited over a UCO kernel for TRISO particles.

TRISO fuel is a key component of advanced, small modular nuclear reactors due to its inherent safety at high temperatures and irradiation levels, and decreased proliferation risk relative to current reactors. However, a more efficient cooling method for the fuel elements may increase thermal control and allow for an increase in fuel density. Also, reducing fission product gas buildup and cladding stress would significantly increase fuel lifetime for both fast and thermal reactors. For the proposed TRISO/graphite infiltrated foam for HTGR, the foam provides structural reinforcement for the TRISO/graphite mixture and the hollow ligaments serve as a network cooling passages, thereby allowing for coolant flow in much closer proximity to the fuel particles compared to current fuel elements and potentially allow for an increase in fuel density.

For the proposed vented TRISO foam fuel for GFR using a deep-burn fuel cycle, the hollow ligaments are used to vent fission products. If not removed, the fission gases stress the fuel matrix and cladding, limiting the lifetime of the fuel and its burn-up level. Fission product gases can be removed from the fuel and transported to a reflector or blanket for more efficient transmutation, or completely removed from the core to an on-site facility where it can be processed for long-term storage. The controlled removal of fission gases from the fuel is critical to achieving deep burn-up and realization of the benefits which include significantly reducing the volume and toxicity of nuclear waste, minimizing proliferation risk, and increased power efficiency by utilizing more of the energy content in the low enriched uranium fuel.

The proposed technology development represents both near-term (HTGR) and longer term (GFR) applications for hollow ligament foam in small modular reactors, and has potential to significantly improve the performance and manufacturability of TRISO-based fuel.

These and other features and advantages of the present invention will become apparent from the following description of the invention, when viewed in accordance with the appended claims.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION

Figure 1:
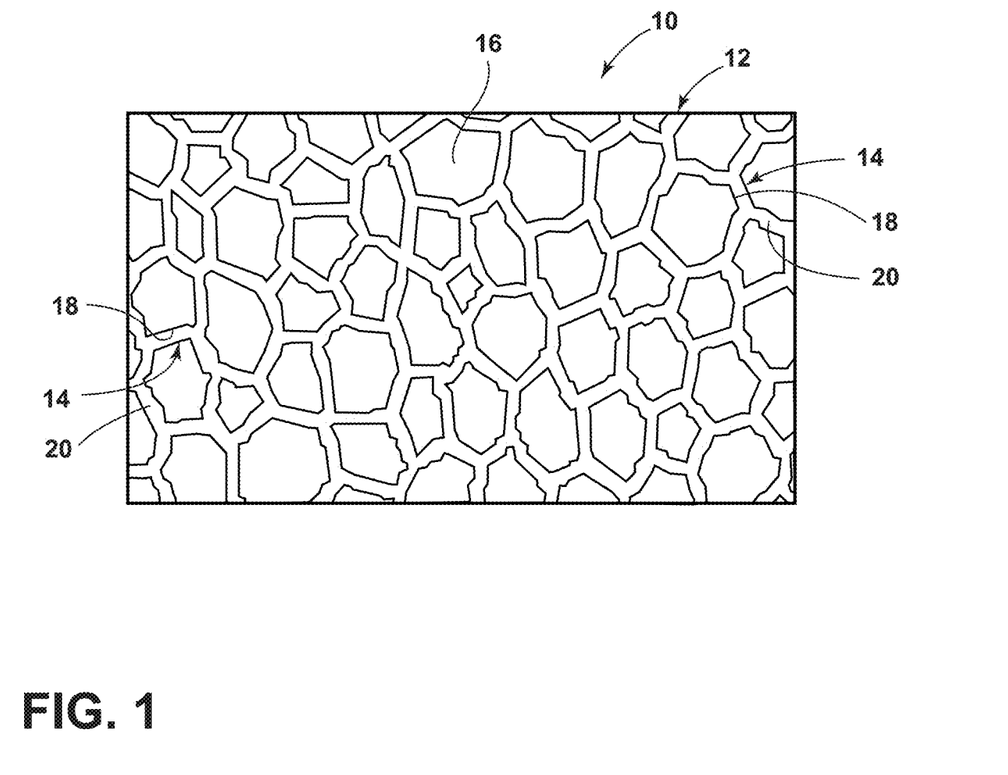
FIG. 1 illustrates a schematic view of a non-limiting embodiment of a nuclear fuel element.

FIG. 1 illustrates a schematic view of a non-limiting embodiment of a nuclear fuel element 10. The nuclear fuel element 10, and a method for making the same, are provided. The nuclear fuel element 10 includes a porous support 12. The nuclear fuel element 10 further includes a ligament 14. The porous support 12 defines a pore 16 adjacent to the ligament 14. In various embodiments, the porous support 12 defines a plurality of pores 16 with the pores in fluid communication with each other. The ligament 14 has an interior surface 18 spaced from the pore 16. The interior surface 18 defines a void 20 within the ligament 14 and extending at least partially through the ligament 14. In various embodiments, the nuclear fuel element 10 includes a plurality of ligaments 14 with the voids 20 of the ligaments 14 in fluid communication with each other. The ligament 14 may be further defined as a hollow ligament defining the void 20 extending from a first opening to a second opening.

The porous support 12 may have a total porosity greater than about 70%. Alternatively, the total porosity may be greater than about 70% and less than about 90%. Alternatively, the total porosity may be greater than about 77% and less than about 85%. One example of an optimum total porosity is about 77%, which provides a good balance between heat transfer and pressure drop. This optimum design provides just enough fissile material to be critical, without resorting to excessively large reactor sizes or using weapons grade enrichments. The fuel matrix is adaptable to both thermal and fast reactors by inclusion or deletion of moderator material (e.g. ZrH or C). Having a thin thickness of the nuclear fuel allows for a high total porosity to maintain the heat transfer efficiency and to keep the temperature difference between the ligament (fuel) centerline and the coolant (e.g., helium or hydrogen) bulk temperature as low as possible.

Figure 2:
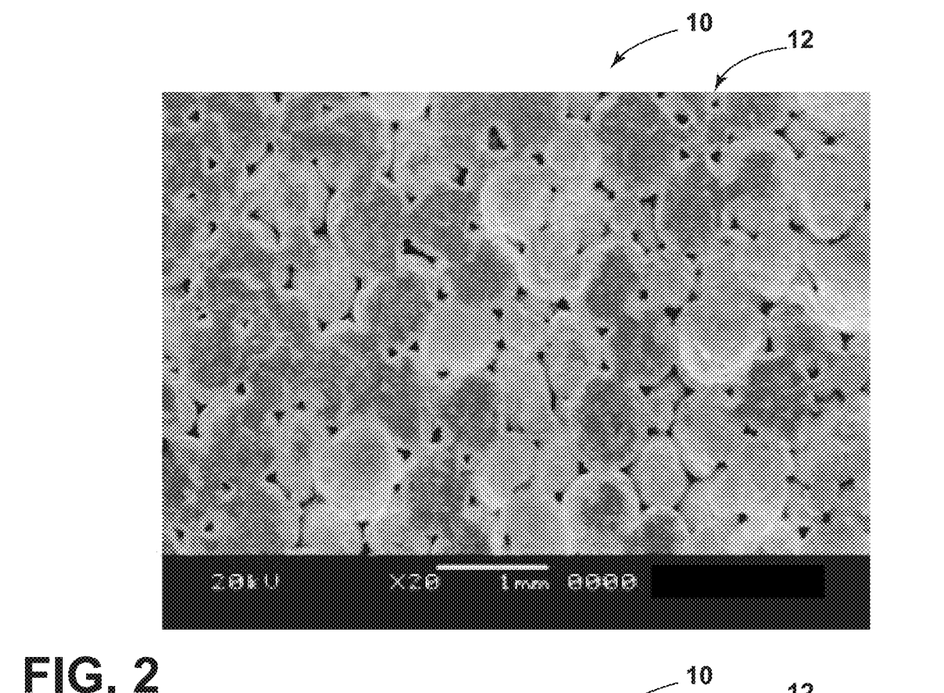
FIG. 2 is a SEM micrograph magnified at 20× of a porous support including ligaments and pores.
Figure 3:
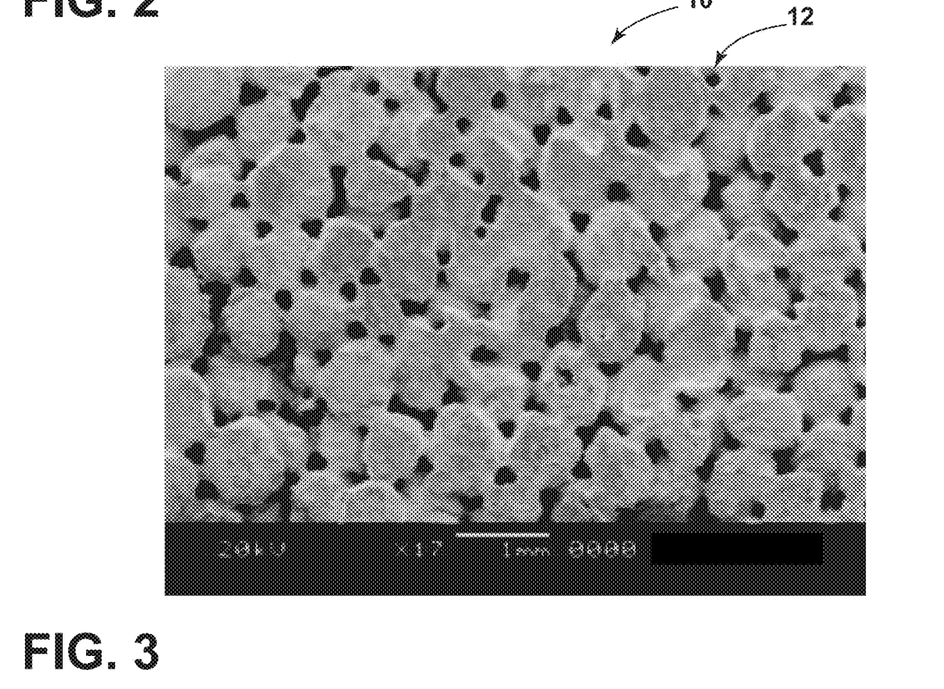
FIG. 3 is a SEM micrograph magnified at 17× of a porous support including ligaments and pores.
Figure 4:
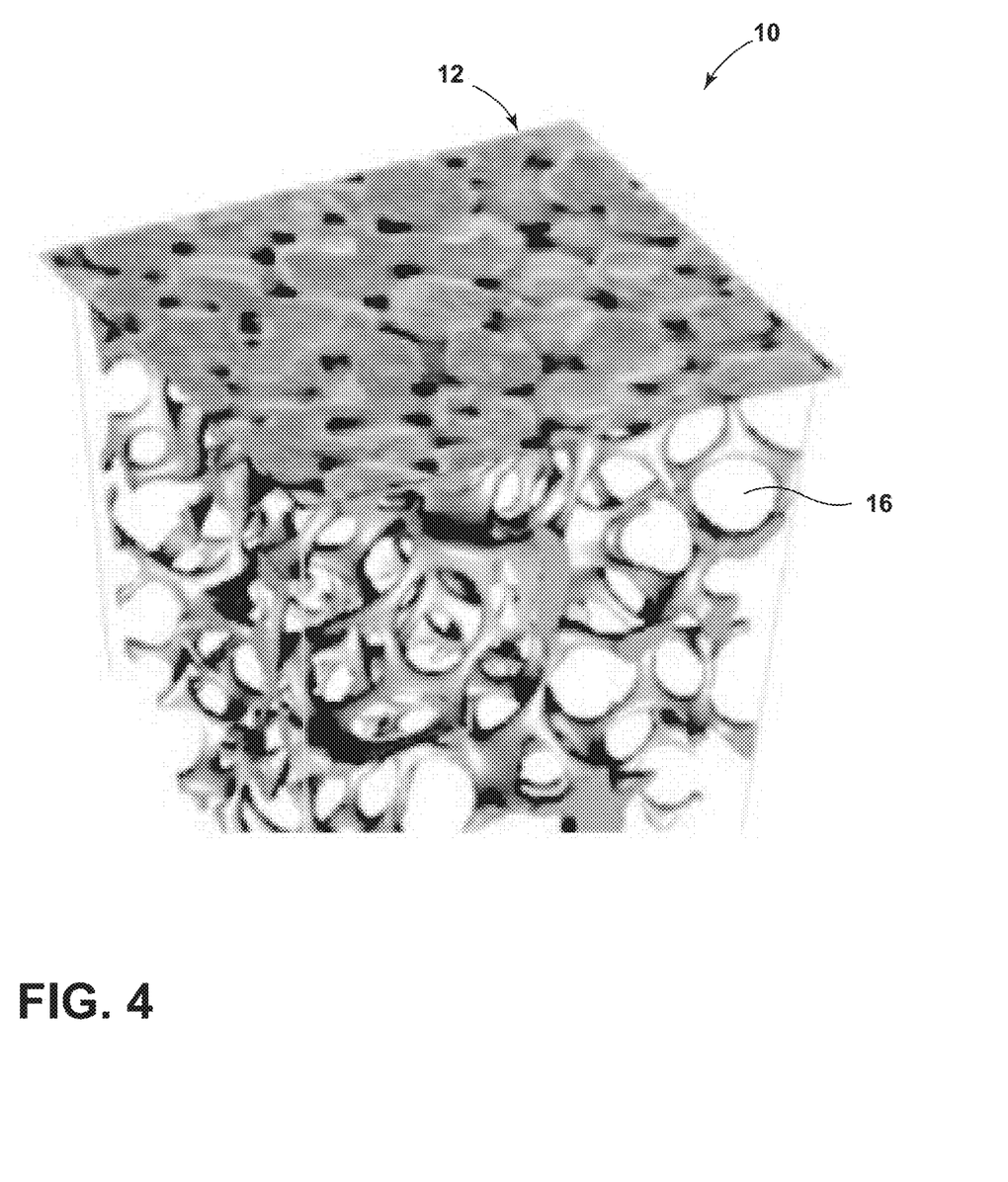
FIG. 4 is a tomography scan illustrating a non-limiting embodiment of a network of interconnected internal microchannels with a SEM micrograph overlaid thereon.

FIG. 2 is a SEM micrograph magnified at 20× of the porous support 12 including a foam ligament structure before being infiltrated with nuclear fuel. FIG. 3 is a SEM micrograph magnified at 17× of the porous support 12 including a foam ligament structure before being infiltrated with nuclear fuel. FIG. 4 is a tomography scan illustrating a network of interconnected internal microchannels with a SEM micrograph overlaid thereon.

The porous support 12 may be formed utilizing any method known in the art so long as the porous support 12 remains suitable for use in a nuclear fuel element 10. One exemplary process for forming the porous support 12 includes utilizing a reticulated vitreous carbon (RVC) foam skeleton. First, commercially available polyurethane foam may be purchased in the desired pore size. Then, the polyurethane foam may be infiltrated with a carbon-bearing resin and pyrolyzed to form a porous, open-celled material comprised of vitreous (glassy) carbon, which is called the RVC foam skeleton. Some shrinkage may occur at this step, but the original pore structure of the polyurethane foam may be retained during conversion to RVC. The RVC foam may have an extremely high void volume (e.g., 97%), combined with self-supporting rigidity. Pore densities from 3 to 100 pores per linear inch (ppi) are readily available, and higher ppi foams can be made by compressing 100-ppi material prior to pyrolysis in one, two, or three dimensions. Compression or stretching can also be used to create directional properties (e.g., strength, pressure drop, etc.). Additionally, the RVC foam skeleton can be machined to near final dimensions prior to vapor infiltration.

High ppi (e.g., hundreds of ppi) compressed carbon foam may be used as the skeletal structure for increasing the surface area and heat transfer of the nuclear fuel. 65 ppi foam was selected for initial development, but foams up to 130 ppi are readily produced through resin infiltration of pyrolysis of polyurethane foam, yield vitreous carbon. By compression of foam prior to the conversion to carbon, foams in excess of 1000 ppi have been fabricated. Compressed foams may be anisotropic structures with directional fluid flow, thermal, and mechanical properties, which may be tailored.

In various embodiments, the porous support 12 (e.g., the ligaments 14) includes one or more materials selected from the group consisting of carbon, graphite, SiC, Nb, Zr, Nb, Mo, Hf, Ta, W, Re, TiC, TaC, ZrC, SiC, HfC, $BeC_2$, $B_4C$, NbC, GdC, $HfB_2$, $ZrB_2$, $Si_3N_4$, $TiO_2$, BeO, $SiO_2$, $ZrO_2$, $HfO_2$, $Y_2O_3$, $Al_2O_3$, $Sc_2O_3$, and $Ta_2O_5$. In one embodiment, the porous support 12 (e.g., the ligaments 14) includes silicon carbide (SiC). In another embodiment, the porous support 12 (e.g., the ligaments 14) includes niobium (Nb). Alternatively, the porous support 12 may include an open-celled foam structure/skeleton including a carbon-bearing material selected from the group of carbon bonded carbon fiber (CBCF) foam, reticulated vitreous carbon (RVC) foam, pitch derived carbon foam (PDCF), and graphite foam.

Figure 5:
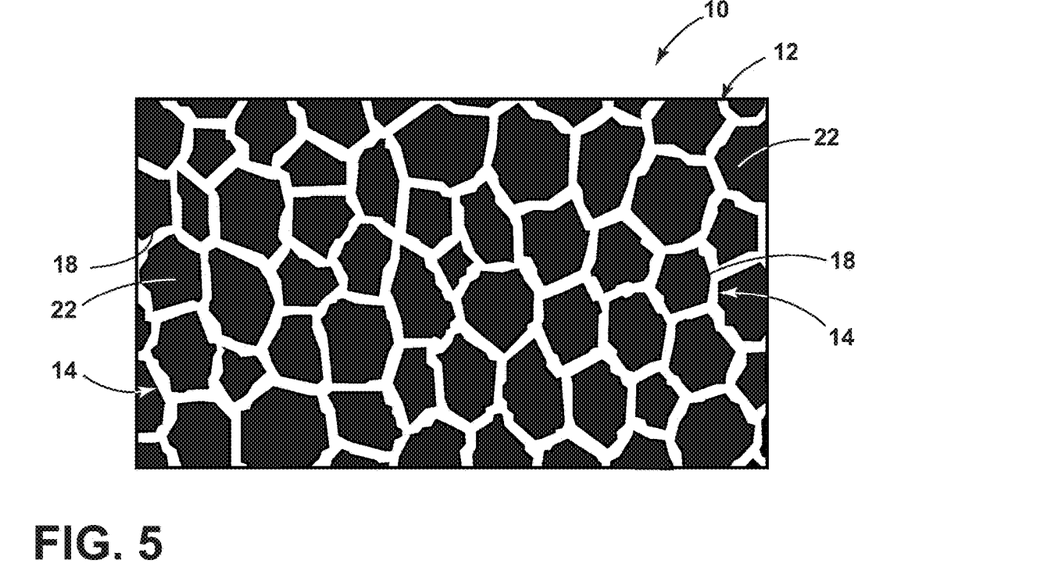
FIG. 5 illustrates a schematic view of a non-limiting embodiment of a nuclear fuel element including a nuclear fuel material.
Figure 6:
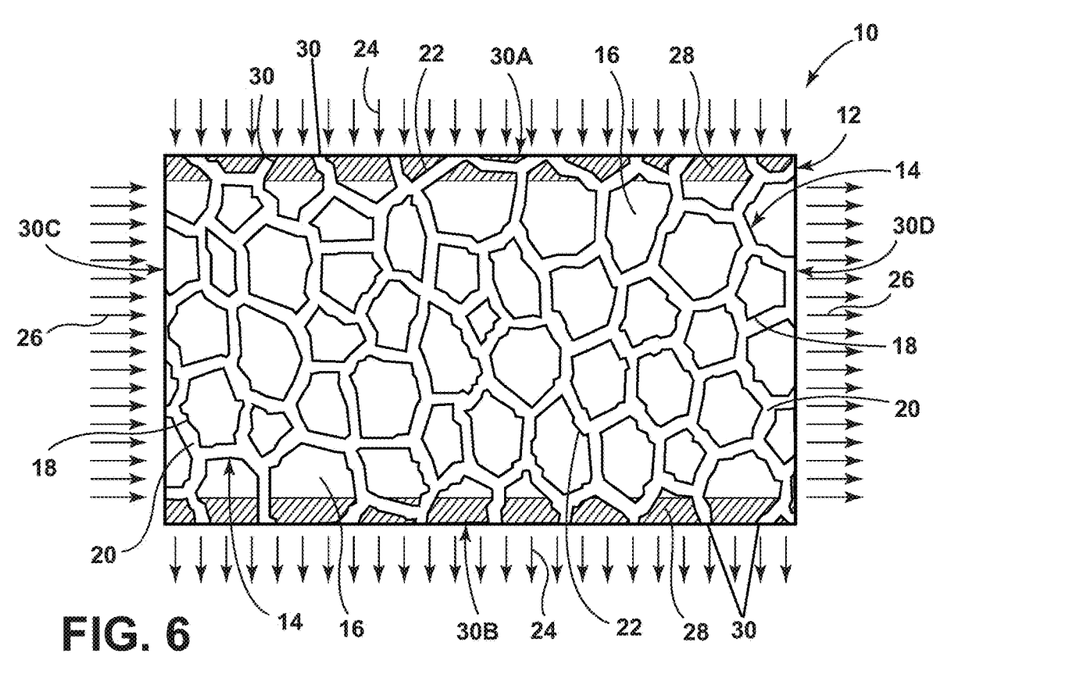
FIG. 6 illustrates a schematic view of another non-limiting embodiment of a nuclear fuel element including a nuclear fuel material.

FIGS. 5 and 6 illustrate schematic views of a non-limiting embodiments of the nuclear fuel element 10 including a nuclear fuel material 22. The void 20 of the ligament 14 and the pore 16 of the porous support 12 cooperate to provide improved cooling and gas mobility to the nuclear fuel element 10. In certain embodiments, the void 20 is substantially free of the nuclear fuel. The phrase "substantially free" as utilized herein with reference to the void 20 means that the void 20 includes the nuclear fuel in an amount of no greater than 10, no greater than 5, no greater than 1, or no greater than 0.1 vol %, based on a total volume of the void 20. In various embodiments, the pore 16 has a volume and the pore 16 includes the nuclear fuel material in an amount of at least 50, at least 60, at least 70, at least 80, at least 90, or at least 99 vol %, based on the volume of the pore 16. In other embodiments, the pore 16 is substantially free of the nuclear fuel. The phrase "substantially free" as utilized herein with reference to the pore 16 means that the pore 16 includes the nuclear fuel in an amount of no greater than 10, no greater than 5, no greater than 1, or no greater than 0.1 vol %, based on a total volume of the pore 16.

With particular reference to FIG. 5, in some embodiments, the nuclear fuel material 22 is disposed in the pore 16. In these and other embodiments, the nuclear fuel material 22 includes a moderator and a tri-structural isotropic (TRISO) particle. It is to be appreciated that the nuclear fuel material 22 may include a moderator and a plurality of the TRISO particles. In certain embodiments, the moderator may include graphite. In these and other embodiments, the nuclear fuel material further comprises zirconia. For high temperature gas-cooled reactors (HTGR), a slurry of TRISO particles and graphite may be casted and sintered into the pores 16. The porous support 12 may provide structural reinforcement for the TRISO/graphite mixture and the hollow ligaments, which can be varied in size and spacing, serving as network cooling passages thereby allowing for coolant flow in much closer proximity to the fuel particles compared to current fuel elements. In addition, by using SiC foam the thermal conductivity of the fuel element increases. In various embodiments, the voids 20 permit the flow of helium gas to purge tritium from the nuclear fuel element 10.

With particular reference to FIG. 6, in other embodiments, the ligament 14 of the porous support 12 includes, consists essentially of, consists of, or is formed from, the nuclear fuel material 22. In these and other embodiments, the nuclear fuel material 22 includes a nuclear fuel including atoms of uranium, carbon, and oxygen. For example, the nuclear fuel may include uranium dioxide ($UO_2$) and uranium acetylide ($UC_2$) ("UCO fuel"). This TRISO-like porous support 12 in which the ligaments 14 are composed of UCO fuel as the inner layer deposited by CVD may include the same cladding currently deposited over a UCO kernel for TRISO particles. In certain embodiments, the ligament 14 is formed from the nuclear fuel.

The nuclear fuel material 22 may further include a cladding overlying the nuclear fuel. The cladding may include a porous carbon buffer layer, followed by pyrocarbon, followed by silicon carbide, and followed by an external coating of pyrocarbon. The cladding may protect the underlying nuclear fuel material 22 from exposure to hot hydrogen gases, and can serve as a barrier to prevent migration of fission products, especially fission product gases. In other embodiments, the cladding may include one or more materials selected from the group of NbC, ZrC, BeO, $BeC_2$, $ZrC_2$, SiC, pyrolytic carbon, diamond, and diamond-like carbon. The cladding may have any thickness suitable to function as a barrier coating (e.g., about 25 microns).

With continuing reference to FIG. 6, the nuclear fuel element 10 is adapted to direct a first fluid 24 through the void 20 and a second fluid 26 through the pore 16. It is to be appreciated that the first fluid 24 and the second fluid 26 may be the same or different. The first fluid 24 or the second fluid 26 may include helium gas. For gas-cooled fast reactors (GFR) using a deep-burn fuel cycle, the first fluid 24 may purge fission product plenum through the pore 16 and the second fluid 26 may provide cooling to the ligament 14.

The nuclear fuel element 10 includes a facesheet 28 overlying the porous support 12. The facesheet 28 defines a hole 30. The hole 30 is in fluid communication with the void 20. In certain embodiments, the facesheet 28 defines a plurality of the holes 30 and the holes 30 are in fluid communication with the voids 20. The facesheet 28 may include, consist essentially of, consist of, or be formed from, niobium.

In some embodiments, the porous support 12 may have a first face 30A, a second face 30B opposite the first face 30A, a third face 30C transverse to the first face 30A, and a fourth face 30D opposite the third face 30C. In various embodiments, a first facesheet 28A overlies the first face 30A and a second facesheet 28B overlies the second face 30B. In this and other embodiments, the ligaments 14 adjacent the third face 30C and the fourth face 30D are substantially free of voids 20. The phrase "substantially free" as utilized herein with reference to the outer diameter face 30E means that the third and fourth faces 30C, 30D includes the voids 20 in an amount of no greater than 5, no greater than 1, no greater than 0.1, or no greater than 0.01%, based on a total surface area of the third and fourth faces 30C, 30D. By controlling flow of the first fluid 24 and the second fluid 26, the nuclear fuel element 10 exhibits a balance between (1) maximizing fuel volume to keep enrichment acceptable (50+ % vol % dense foam fuel possible), (2) maximizing open volume outside ligaments 14 for optimal helium cooling, and (3) minimizing open volume inside hollow ligament 14 purge channels for optimal fission gas removal.

Exemplary nuclear fuel elements 10 will now be described with reference to FIGS. 7-11. It is to be appreciated that the exemplary nuclear fuel elements 10 are non-limiting and may be in any configuration known in the art.

Figure 7A:
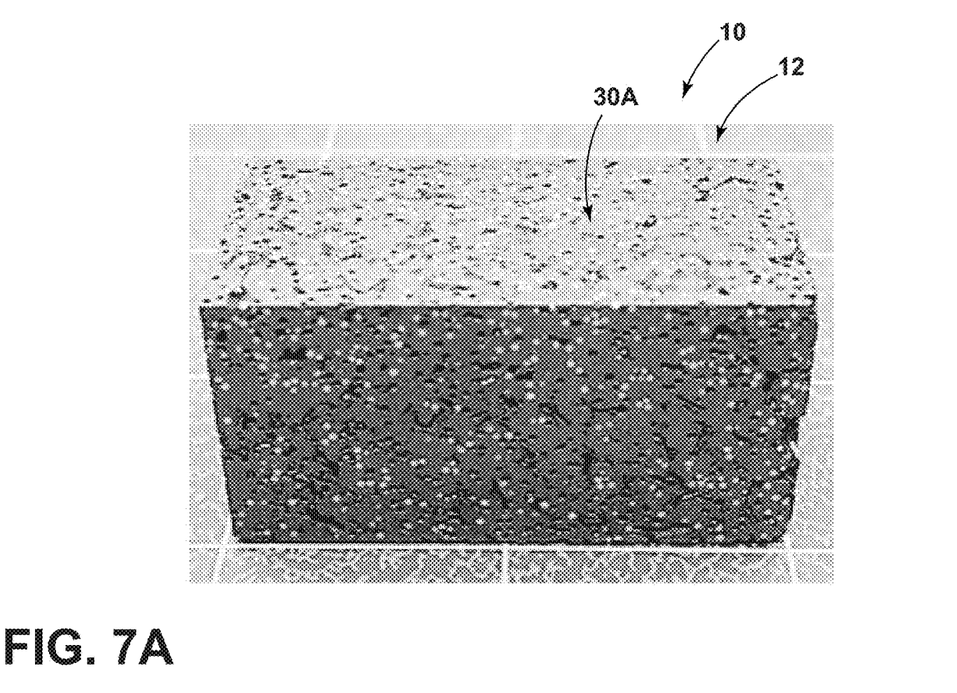
FIG. 7A is an image of a side view of a non-limiting embodiment of a nuclear fuel element including a nuclear fuel material.
Figure 7B:
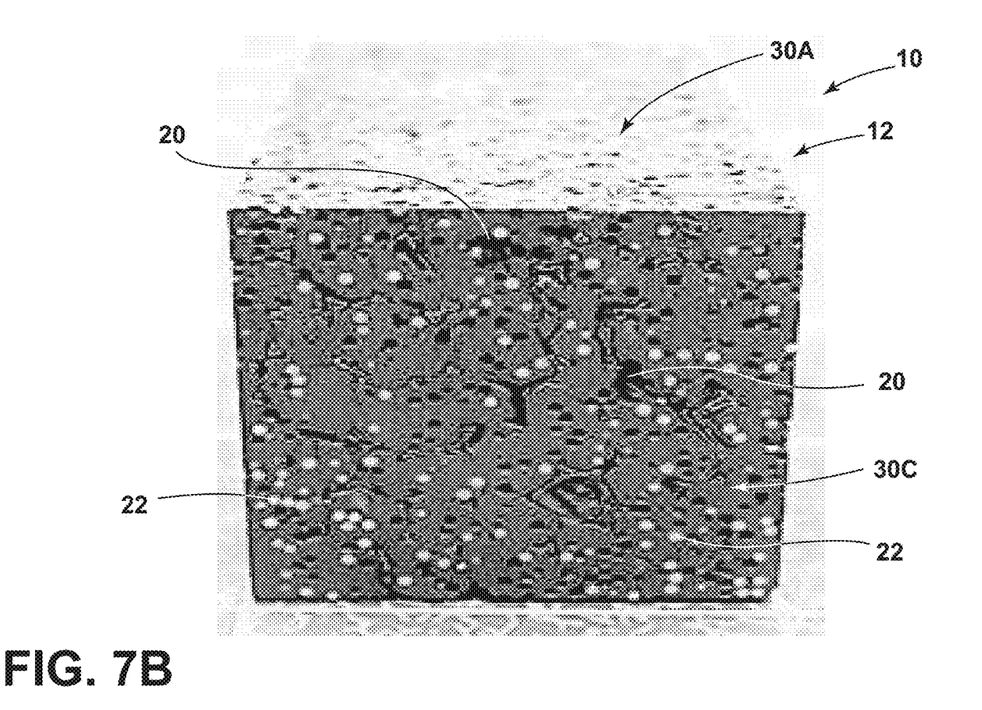
FIG. 7B is an image of a top view of the non-limiting embodiment of the nuclear fuel element of FIG. 7A.

FIGS. 7A and 7B are images of side and top views of a non-limiting embodiment of the nuclear fuel element 10 including the nuclear fuel material 22. A slurry of 650-μm surrogate TRISO particles and graphite paste may be cast into the pores 16 of a 90% porous SiC foam, followed by an elevated temperature sintering and a surface machining to expose the void 20 of the ligaments 14. As a result, the nuclear fuel element 10 may be formed including surrogate TRISO particles embedded in graphite reinforced with SiC foam containing an interconnected network of cooling channels (i.e., the voids 20 in fluid communication with each other). The particle concentration may be from at least 20% vol. %, alternatively at least 30 vol. %, or alternatively at least 45 vol. %, based on a total volume of the pores 16. The size, spacing, and wall thickness of the ligaments 14 can be varied substantially to achieve the optimal combination of coolant flowrate, pressure drop, and fuel volume. The TRISO matrix may be infiltrated into foam that has the voids 20 already present of the faces 30 of the porous support 12 without machining. To prevent particles from entering the voids 20 during foam infiltration, wax can be used to temporarily block the passages and it can later be removed through high temperature exposure to re-open the passages.

Figure 8A:
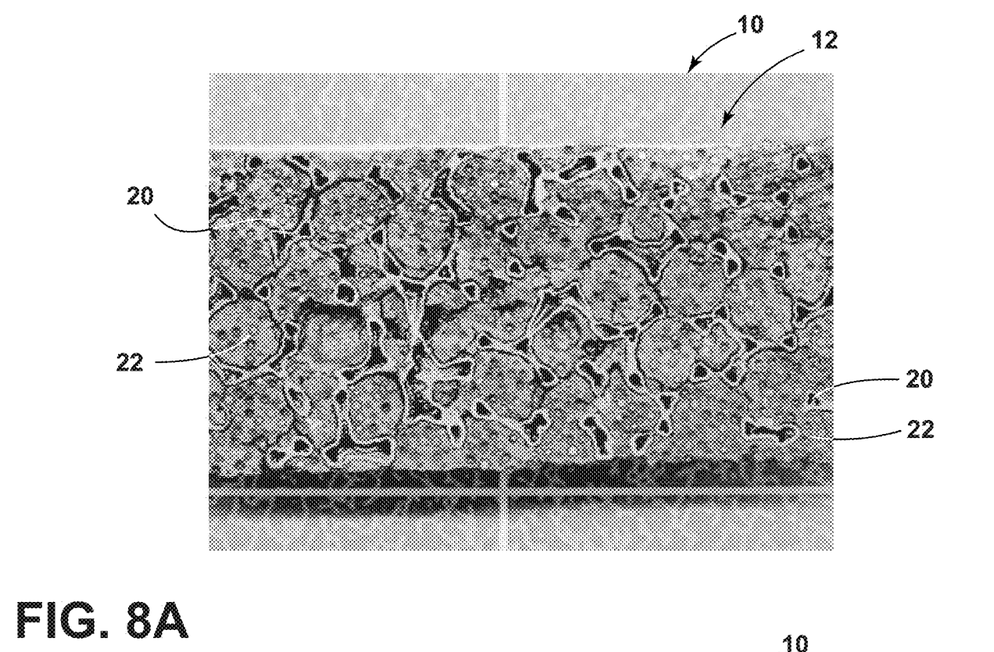
FIG. 8A is an image of a cross-section of another non-limiting embodiment of a nuclear fuel element including a nuclear fuel material.
Figure 8B:
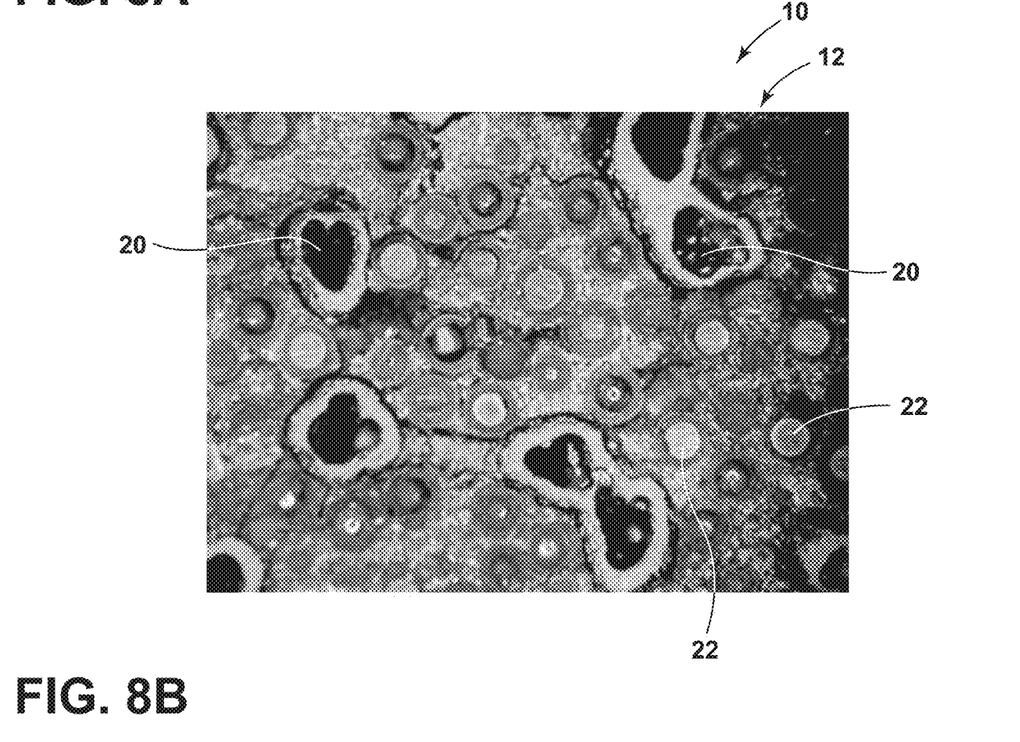
FIG. 8B is an enhanced image of the cross-section of the non-limiting embodiment of the nuclear fuel element of FIG. 8A.
Figure 9A:
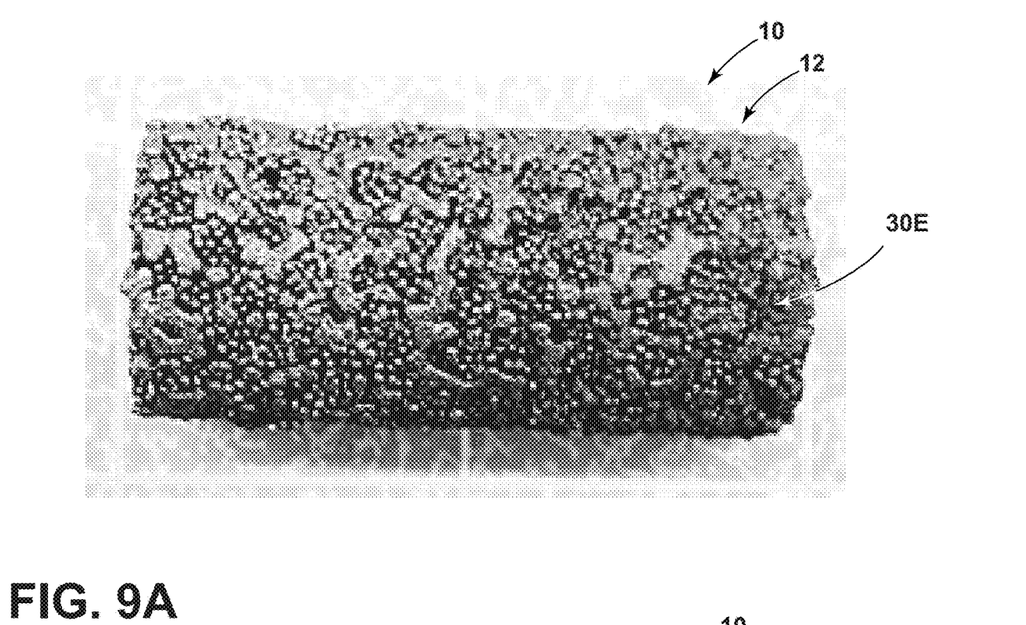
FIG. 9A is an image of a side view of another non-limiting embodiment of a nuclear fuel element including a nuclear fuel material.
Figure 9B:
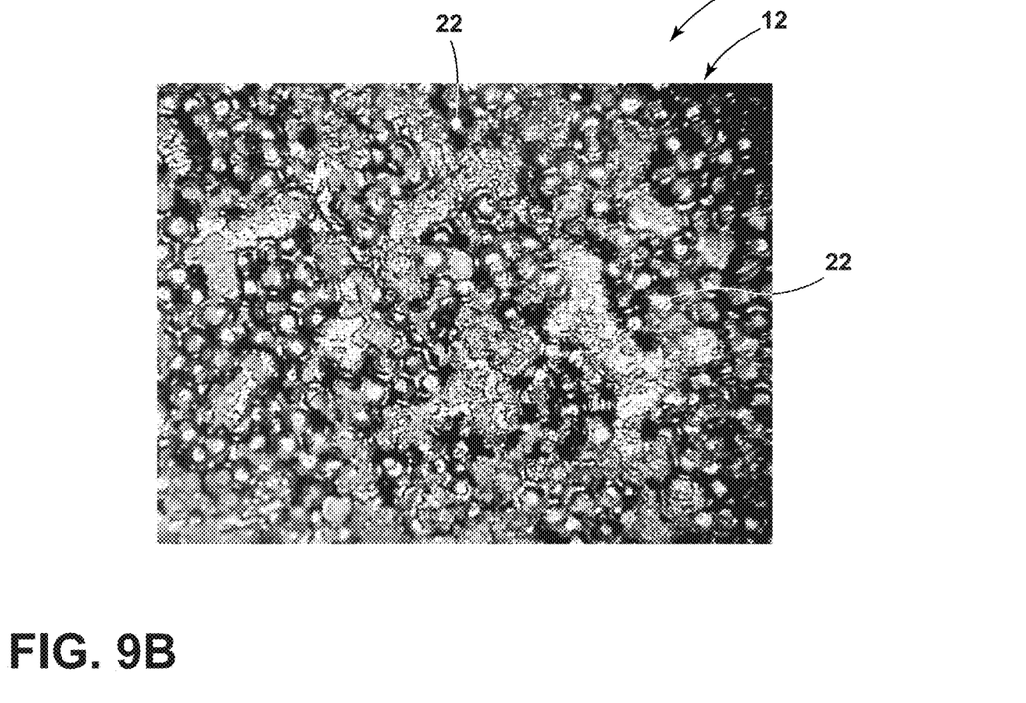
FIG. 9B is an enhanced image of the side view of the non-limiting embodiment of the nuclear fuel element of FIG. 9A.
Figure 9C:
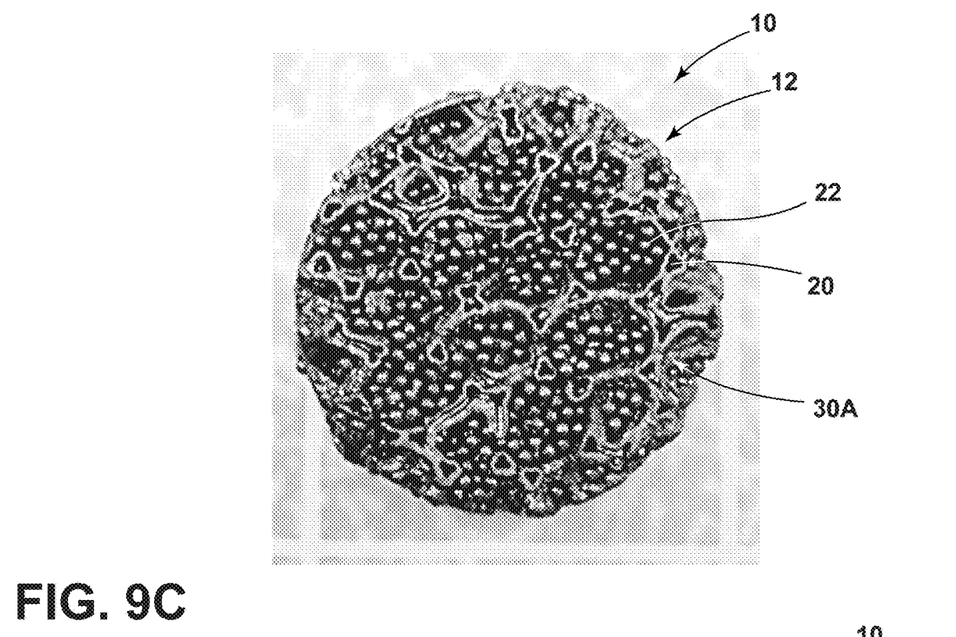
FIG. 9C is an image of a top view of the non-limiting embodiment of the nuclear fuel element of FIG. 9A.
Figure 9D:
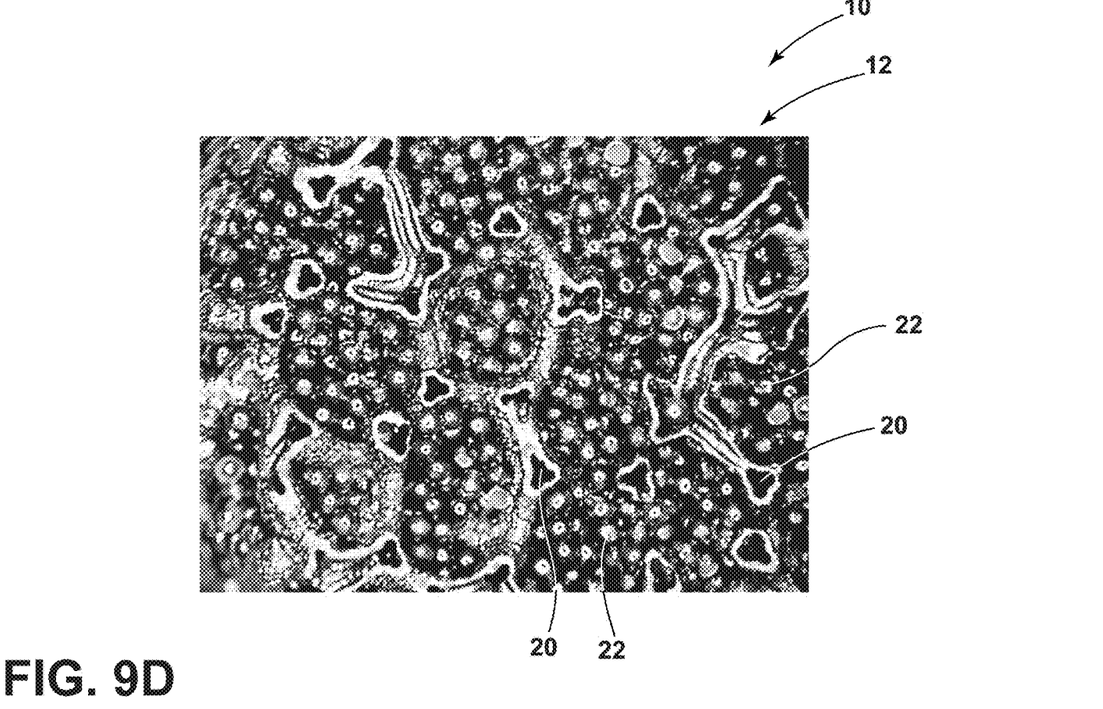
FIG. 9D is an enhanced image of the top view of the non-limiting embodiment of the nuclear fuel element of FIG. 9C.

FIGS. 8A and 8B are images of a cross-section of another non-limiting embodiment of the nuclear fuel element 10 including the nuclear fuel material 22. In these and other embodiments, the pores 16 between the ligaments 14 ("hollow foam ligaments") may be vacuum-infiltrated with a TRISO surrogate/graphite slurry, followed by high temperature pyrolysis. Pyrolytic carbon (PyC)-coated $ZrO_2$ particles (800 μm dia.) may be used as the TRISO surrogate. The hollow ligament foam structure is clearly evident in FIGS. 7A and 7B. It is to be appreciated that sectioning of the nuclear fuel element 10 shown in in FIGS. 7A and 7B resulted in partial removal of the $ZrO_2$ particles of the TRISO surrogate from the PyC shell at the surface of the cross-section. Any remaining unfilled pores 16 may be filled with the TRISO surrogate utilizing an optimization of the vacuum infiltration process. In certain embodiments, an injection molding at elevated pressure may be used to infiltrate the TRISO surrogate/graphite matrix into the porous support 12.

FIGS. 9A-9D are images of side and top views of another non-limiting embodiment of the nuclear fuel element 10 including the nuclear fuel material 22. In these and other embodiments, surrogate TRISO particles may be first infiltrated into the pores 16 between the ligaments 14 ("hollow foam ligaments") thereby leaving gaps between the surrogate TRISO particles and the ligaments 14. Next, the gaps between the particles and the ligaments 14 may be infiltrated with a carbon-bearing resin, followed by pyrolysis. The process of resin infiltration and pyrolysis may be repeated multiple times, which may be similar to the manufacturing of carbon/carbon composites. In certain embodiments, the outer diameter face 30E is substantially free of the voids 20 (see FIGS. 9A and 9B) while the voids 20 are present on the first and second faces 30A, 30B (see FIGS. 9C and 9D). The phrase "substantially free" as utilized herein with reference to the outer diameter face 30E means that the outer diameter face 30E includes the voids 20 in an amount of no greater than 5, no greater than 1, no greater than 0.1, or no greater than 0.01%, based on a total surface area of the outer diameter face 30E. In other words, the hollow ligament passages are closed on the outer diameter of the fuel element and open on the ends to allow for axial flow. In various embodiments, depending on the infiltration approach and the size of the hollow ligament passages, a fuel volume ranging from 30% to 45% can be achieved.

Figure 10:
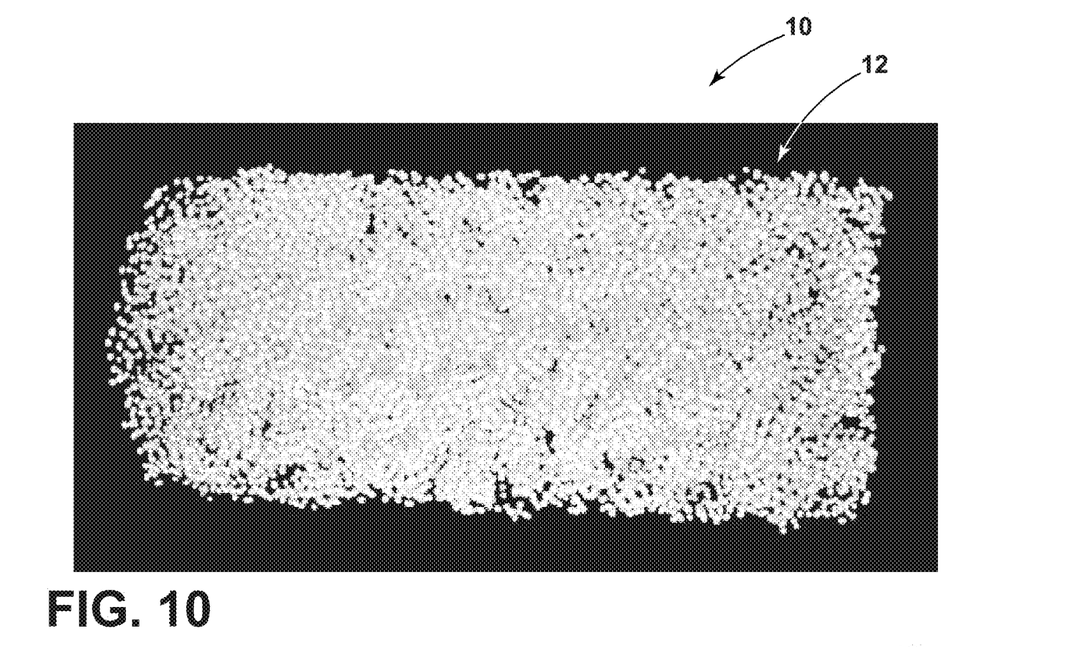
FIG. 10 is a tomography scan illustrating a non-limiting embodiment of a nuclear fuel element including a nuclear fuel material.
Figure 11:
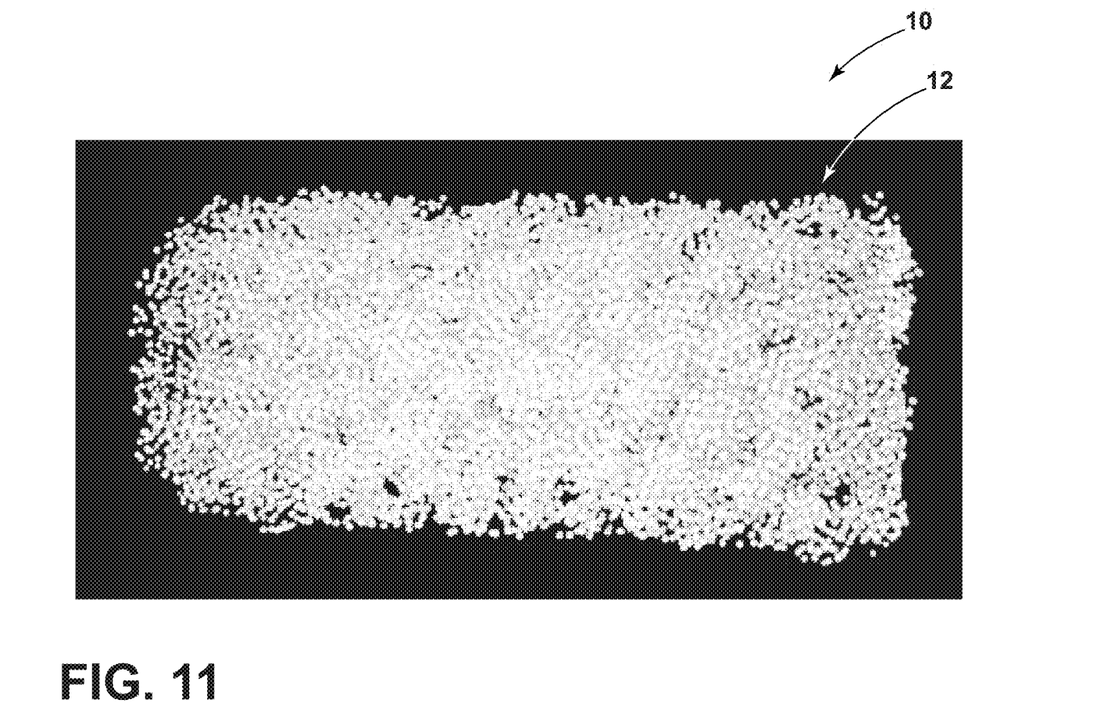
FIG. 11 is a tomography scan illustrating another non-limiting embodiment of a nuclear fuel element including a nuclear fuel material.

FIGS. 10 and 11 are tomography scans illustrating non-limiting embodiments of the nuclear fuel element 10 including the nuclear fuel material 22. In particular, FIG. 10 shows the nuclear fuel element 10 including TRISO surrogate/graphite and FIG. 11 shows the nuclear fuel element 10 including TRISO surrogate/carbon from pyrolyzed resin. In these embodiments, the nuclear fuel element 10 are 20 mm diameter×50 mm long and include the TRISO surrogate/carbon mixture. However, it is to be appreciated that the dimensions or configuration are not limited for the nuclear fuel element 10. The still images of the X-ray tomography scanning show round pockets of densely packed particles (with a bright appearance) within the pores 16 of the nuclear fuel element 10 (which appear gray) confirming that the pores 16 are filled with the TRISO surrogate/carbon mixtures and that the TRISO surrogate particles are densely packed within the pores 16.

In these and other embodiments, the porous support 12 may be infiltrated with the desired nuclear fuel to the desired overall density by using chemical vapor infiltration (CVI), or some other vapor, liquid, or physical deposition process. Typical infiltration levels, depending on the application, fall in the 10-30 vol % range (added to the 3 vol % dense RVC skeleton). At this stage, the thermal and mechanical properties of the foam may be dictated by the infiltrated material. The original RVC foam skeleton may have little influence on the final foam properties, and can often be removed through reaction with hydrogen or oxygen, depending on the particular material that was infiltrated.

Chemical vapor infiltration (CVI), a variation of the chemical vapor deposition (CVD) process, may be used primarily for depositing material inside of the porous foam, felt, mesh, or fibrous preform. The vapor deposition process is an extremely versatile and relatively inexpensive method of molecular-forming materials that are difficult to machine or otherwise produce by conventional processes. CVI relies on the decomposition of a gaseous precursor, flowed over (in the case of CVD), or through (in the case of CVI) a heated substrate, with subsequent condensation from the vapor state to form a solid deposit on the substrate. Benefits of CVD/CVI include the ability to produce deposits of controlled density, thickness, orientation, and composition. Impurity levels are typically less than 0.1%, with densities up to 99.9% being achievable. In addition, CVD/CVI coating processes exhibit the greatest throwing power, or ability to uniformly deposit on intricately shaped or textured substrates.

Perhaps the greatest benefit of CVD/CVI is that a wide variety of materials can be deposited at temperatures that are 10% to 50% of the melting point of the coating material itself, which eliminates the need to perform liquid-phase infiltration at high temperatures. In preparation for infiltration, the RVC foam substrate/skeleton can easily be machined to near final dimensions, while accounting for minor dimensional changes that occur during infiltration.

In the CVI process, reactant gases (typically metal chlorides or fluorides containing the desired coating material(s)) are flowed through a heated substrate (e.g., RVC foam). The compound(s) within the reactant gas stream react near the heated ligament surfaces to form a continuous, uniform coating. For example, NbC is deposited at 1000-1200° C. via reaction of niobium pentachloride (NbCl5) with methane (CH4) and hydrogen (H2).

Coatings of ZrC, TaC or UC can be deposited by analogous reactions. The primary process variables that may be optimized are temperature, pressure, reactant concentration and flow rate, and deposition time. Using CVI, multiple materials may be deposited simultaneously in a well-mixed state as a single deposit. Optionally, after CVI infiltration, exposure to high temperature hydrogen may be used to remove the underlying RVC foam skeleton, and any free carbon in the deposited coating. Removal of the underlying skeleton using hydrogen or oxygen has virtually no impact on the mechanical performance of the foam, since the properties are primarily determined by the stiff metal carbide coating.

In the chemical vapor infiltration (CVI) process for a single metal carbide, the appropriate metal in pellet form is first chlorinated and then flowed over a heated substrate. Hydrogen and a carbon source are added to the system. Through a combination of thermal decomposition and chemical reaction, the carbide deposits on the heated substrate surface, while HCl gas is removed from the reaction chamber by a vacuum system. Deposition of more than one metal carbide simultaneously is more complicated because the metal chlorides must be well mixed and in the desired ratio in order to form a coating of the desired composition and homogeneity. For the case of the simultaneous deposition of UC, NbC, and ZrC, one approach is to chlorinate each metal separately and then mix the gases together prior to reaching the heated substrate. This approach requires independent control of three separate chlorine sources to uniformly mix the three chlorides.

An alternate approach is to fabricate a pellet containing all of the three metals mechanically mixed together. In this case, fine powders (e.g., —325 mesh powders, 0.0017" diameter) are mechanically mixed in an appropriate weight ratio, e.g. 10% U:45% Zr:45% Nb and then mechanically pressed under high pressure to create a pellet, e.g., a cylindrical pellet 0.5" dia.×0.25" long. The "mechanically alloyed" pressed pellet containing the three metals is then used in the CVI process described above.

Another approach is to manufacture a homogenous pellet that is a true metallurgical alloy of the three metals. This can be done by, for example, by liquid-phase sintering at very high temperatures. A eutectic alloy of the two or three-carbide alloys can be produced this way.

In general, fine-grained, fully dense coatings deposited by CVD have better stiffness and strength than do bulk materials having the same composition fabricated by powder processing. The elastic moduli of such CVD films have been regularly measured up to 25% higher than those of the bulk materials. RVC foam is extremely well-suited as a lightweight substrate onto which very high-stiffness coatings may be deposited/infiltrated by CVD/CVI. Since the modulus of the deposited film is so much greater than that of the vitreous carbon foam skeleton, the carbon foam has essentially no influence on the properties of the final product; it merely acts as a "locator" for the deposited films. Ceramic foams fabricated via CVI exhibit significantly greater thermal and mechanical fracture toughness than do monolithic ceramics since the ligamental structure severely inhibits crack propagation.

Optionally, a protective coating, e.g. ZrC, may be vapor deposited on top of the layer(s) of nuclear fuel as an additional moderator or encapsulation barrier. The protective coating can contribute significantly to the overall porous body's strength Other coating techniques may be used to deposit the nuclear fuel and refractory metal carbides or carbonitrides, including chemical reaction deposition (CRD), physical vapor deposition (PVD), electrolytic deposition (ED), cataphoresis deposition (CD), electrophoresis deposition (ED), and sol-gel coating (SGC), and a liquid "painting" technique that uses vacuum infiltration to draw a suspension of fine powder in a liquid binder into the porous body, followed by baking to drive off the liquid binder. Also, a "melt-infiltration" process may be used as a method of introducing the desired metals into the foam structure and coating the ligaments, followed by conversion to a tricarbide form. Also, the fuel material may be "cast" into a thermally/structurally stable foam material.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A nuclear fuel element, comprising:
 a porous support comprising a first face, a second face opposite the first face, a third face transverse to the first face, and a fourth face opposite the third face, the porous support including:
  an open-cell foam structure includes of a plurality of interconnected pores,
  a plurality of ligaments extending through the open-cell foam structure and interconnecting the first face to the second face, wherein each of the plurality of ligaments includes an interior surface spaced from the plurality of interconnected pores, the interior surface defining a void within the ligament such that each of the plurality of ligaments define a hollow channel between the first sheet and the second sheet, each of the plurality of ligaments consisting of a nuclear fuel material and wherein the open-cell foam structure is free of nuclear fuel; and
 a first facesheet overlying the first face of the porous support and defining a first plurality of holes and a second facesheet overlying the second face of the porous support and defining a second plurality of holes, the first plurality of holes being in fluid communication with the second plurality of holes via the plurality of ligaments;

wherein the nuclear fuel material comprises a nuclear fuel containing uranium, and wherein the open-cell foam structure comprises a porosity of between 70% and 90%, such that a first gas flows through the plurality of ligaments from the first face to the second face and a second gas flows through the open-cell foam structure from the third face to the fourth face in a cross-flow configuration, at least one of the first gas and the second gas comprising helium.

2. The nuclear fuel element of claim 1, wherein the open-cell foam structure comprises niobium.

3. The nuclear fuel element of claim 1, wherein adjacent ones of the plurality of the ligaments are in fluid communication with each other.

4. The nuclear fuel element of claim 1, wherein the first facesheet and the second facesheet comprises niobium.

5. The nuclear fuel element of claim 1, wherein the nuclear fuel includes uranium dioxide ($UO_2$) and uranium acetylide ($UC_2$).

* * * * *